(12) United States Patent
Sajid et al.

(10) Patent No.: US 8,000,674 B2
(45) Date of Patent: Aug. 16, 2011

(54) CANCELING SELF-JAMMER AND INTERFERING SIGNALS IN AN RFID SYSTEM

(75) Inventors: Mohammed Sajid, Sacramento, CA (US); Scott Chiu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 595 days.

(21) Appl. No.: 11/830,914

(22) Filed: Jul. 31, 2007

(65) Prior Publication Data

US 2009/0036082 A1 Feb. 5, 2009

(51) Int. Cl.
*H04B 1/10* (2006.01)

(52) U.S. Cl. .................. 455/296; 455/63.1; 455/278.1; 370/268; 370/269

(58) Field of Classification Search .................. 455/424, 455/425, 456.5, 456.6, 561, 550.1, 575.1, 455/522, 1, 501, 63.1, 67.11, 114.2, 115.1, 455/273, 276, 278.1, 283, 334, 114.3; 370/268, 370/269, 206, 282, 286, 287; 375/296, 254, 375/285, 346; 340/10.1, 572.1, 572.4, 568.1, 340/572.8, 825.36, 572.7

See application file for complete search history.

(56) References Cited

U.S. PATENT DOCUMENTS

| 5,444,864 | A | * | 8/1995 | Smith | 455/84 |
| 5,646,623 | A | * | 7/1997 | Walters et al. | 342/129 |
| 5,691,978 | A | * | 11/1997 | Kenworthy | 370/278 |
| 6,640,194 | B2 | | 10/2003 | Takatori et al. | |
| 7,035,365 | B2 | | 4/2006 | Takatori et al. | |
| 7,154,979 | B2 | | 12/2006 | Takatori et al. | |
| 7,574,188 | B2 | * | 8/2009 | Kim | 455/296 |
| 7,671,720 | B1 | * | 3/2010 | Martin et al. | 340/10.1 |
| 2006/0291598 | A1 | * | 12/2006 | Gebara et al. | 375/346 |
| 2007/0072567 | A1 | * | 3/2007 | Nagai et al. | 455/205 |
| 2007/0184782 | A1 | * | 8/2007 | Sahota et al. | 455/63.1 |
| 2007/0194931 | A1 | * | 8/2007 | Miller et al. | 340/572.7 |
| 2007/0207831 | A1 | | 9/2007 | Tinsley et al. | |
| 2008/0009258 | A1 | * | 1/2008 | Safarian et al. | 455/307 |
| 2008/0081551 | A1 | * | 4/2008 | Posamentier | 455/1 |
| 2008/0117025 | A1 | * | 5/2008 | Tuttle | 340/10.3 |
| 2008/0238622 | A1 | * | 10/2008 | Rofougaran et al. | 340/10.1 |
| 2008/0278287 | A1 | * | 11/2008 | Virnich et al. | 340/10.1 |
| 2008/0293352 | A1 | * | 11/2008 | Posamentier | 455/1 |

OTHER PUBLICATIONS

Chiu, Scott "A Method for Detecting Self-Jammer Power Level Under the Presence of Blockers", Filed on May 31, 2007; USPTO U.S. Appl. No. 11/756,326.

Chiu, Scott et al., "A Method for Reducing Amplitude Modulated Noise From Sigma Delta Dac During Carrier Transmission for RFID Transceivers", al Filed on Jun. 29, 2007; USPTO U.S. Appl. No. 11/771,374.

Chiu, Scott et al., "Canceling Self-Jammer Signals in an RFID System", Filed on Jun. 29, 2007; USPTO U.S. Appl. No. 11/771,231.

Chiu, Scott et al., "Filter Scheme for Receiver", Filed on Dec. 20, 2006; USPTO U.S. Appl. No. 11/613,986.

(Continued)

*Primary Examiner* — Duc Nguyen
*Assistant Examiner* — Charles Chow
(74) *Attorney, Agent, or Firm* — Cool Patent, P.C.; Joseph P. Curtin

(57) ABSTRACT

Briefly, in accordance with one or more embodiments, a method and device capable of canceling self-jammer and one or more other interfering signals in an radio frequency identification system or the like is disclosed.

10 Claims, 3 Drawing Sheets

OTHER PUBLICATIONS

Lee, Jeiyoung et al., "A UHF Mobile RFID Reader IC with Self-Leakage Canceller", 2007 IEEE Radio Frequency Integrated Circuits Symposium, 2007, pp. 273-276.

Safarian, A et al., "An Integrated RFID Reader", 2007 IEEE International Solid-State Circuits Conference, ISSCC 2007 / Session 11 / TV Tuner/ RFID / Nov. 7, 2007, pp. 218-219, 598.

Shameli, Amin et al., "An RFID System with Fully Integrated Transponder", 2007 IEEE Radio Frequency Integrated Circuits Symposium, 2007, pp. 285-288.

IMPINJ, "IMPINJ RFID Product Overview", http://www.impinj.com/rfid/default.aspx, pp. 1-2.

* cited by examiner

CANCELING SELF-JAMMER AND INTERFERING SIGNALS IN AN RFID SYSTEM

BACKGROUND

Radio-frequency identification (RFID) systems are capable of wireless data transmissions between an RFID reader and an RFID tag. In a typical RFID system employing passive RFID tags, an RFID reader transmits a signal to an RFID tag. The RFID tag returns the signal by backscattering. In the RFID system, a signal blocker called a self-jammer signal may be generated by coupling of the transmitted signals with signals reflected from the RFID reader antenna, transmitter-to-receiver coupling and/or coupling of the transmitted signal with the backscattered signal. A self-jammer signal may be difficult to detect and may interfere with the RFID reader's reception of the backscattered signal.

DETAILED DESCRIPTION

In the following detailed description, numerous specific details are set forth in order to provide a thorough understanding of claimed subject matter. However, it will be understood by those skilled in the art that claimed subject matter may be practiced without these specific details. In other instances, well-known methods, procedures, and components have not been described in detail so as not to obscure claimed subject matter.

Although the embodiments described herein refer to detection and cancellation self-jammer signals in an RFID system, such embodiments are meant for illustrative purposes and are not intended to limit the scope of the disclosure. The disclosed device and method is useful for detection and cancellation of interfering signals in any of a variety of wireless systems, such as in mobile communications or networking in compliance with the Wi-Fi Alliance, for instance. In this disclosure, interfering signals may be referred to as unwanted signals. Such unwanted signals, in a particular embodiment of a wireless system, may be referred to as "signal blockers," "self-jammer signals," "adjacent channel blockers," "co-channel blockers" and/or "interfering signals." Such unwanted signals may cause a disturbance in the normal operation of the wireless system, resulting in errors and degrading system performance. According to a particular embodiment of a wireless system, a circuit capable of canceling unwanted signals may be referred to herein as a "cancellation loop."

Figure 1:
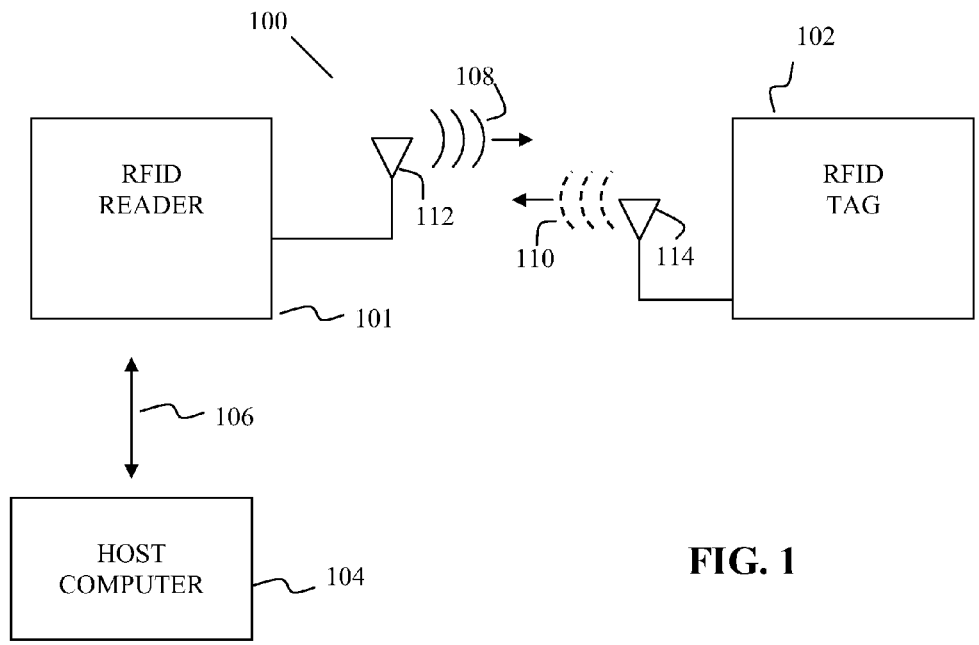
FIG. 1 is a schematic diagram representing an arrangement of an embodiment of an RFID system.

FIG. 1 is a schematic diagram illustrating a particular embodiment of a wireless system. In a particular embodiment, RFID system 100 may comprise RFID reader 101, RFID tag 102 and host computer 104. According to a particular embodiment, RFID reader 101 may transmit an interrogation signal 108 that may be received by RFID tag 102. According to a particular embodiment, RFID tag 102 may modulate and then reflect interrogation signal 108 sent by the RFID reader 101. RFID tag 102 may return interrogation signal 108 back to RFID reader 101 by a variety of methods, such as, for instance, by backscattering interrogation signal 108 to generate backscattered interrogation signal 110. In a particular embodiment, RFID reader 101 may then communicate data received from RFID tag 102 to host computer 104 for processing. However, this is merely an example of a configuration of a wireless system and claimed subject matter is not so limited.

RFID system 100 may operate in a variety of applications such as, for example, product tracking and animal identification. In a product tracking application, RFID tag 102 may be coupled to a product. The tagged product may then be tracked by RFID reader 101 without having to remove the product from packaging. In an animal identification application, RFID tag 102 may be implanted under the skin of an animal. RFID tag 102 may be read by RFID reader 101 in order to identify the animal bearing RFID tag 102. However, these are merely examples of applications for RFID systems and claimed subject matter is not limited in this regard.

In a particular embodiment, RFID tag 102 may be a passive tag. Passive RFID tag 102 may operate using power derived from interrogation signal 108 sent by RFID reader 101. However, this is merely an example of an RFID system employing a passive RFID tag and claimed subject matter is not so limited. For instance, RFID tags may also be active or semi-active and may require a power source in order to operate.

Referring still to FIG. 1, RFID reader 101 may comprise antenna 112. In a particular embodiment, antenna 112 may be capable of sending and/or receiving a signal to and/or from RFID tag 102. According to a particular embodiment, RFID tag 102 may comprise antenna 114. Antenna 114 may be capable of receiving interrogation signal 108 from RFID reader 101 and sending backscattered interrogation signal 110 to RFID reader 101. In a particular embodiment, RFID tag 102 may be capable of communicating data to RFID reader 101 via backscattered interrogation signal 110. However, this is merely an example of capabilities and configurations of RFID reader antennas and RFID tag antennas and claimed subject matter is not so limited. For instance, both RFID readers and RFID tags may have more than one antenna and/or may be capable of sending and/or receiving one or more signals.

According to a particular embodiment, RFID reader 101 may comprise a variety of transmitters (not shown), receivers (not shown), transponders (not shown) and/or transceivers (not shown) capable of transmitting and/or receiving radio frequency (RF) signals. Additionally, RFID tag 102 may comprise a variety of transmitters (not shown), receivers (not shown), transponders (not shown) and/or transceivers (not shown) capable of transmitting and/or receiving radio frequency (RF) signals. However, this is merely an example of various components that may comprise an RFID reader or RFID tag and claimed subject matter is not so limited.

In a particular application, RFID reader 101 may receive backscattered interrogation signal 110 from RFID tag 102 in the presence of other radio frequency emitting devices (not shown) such as, for instance, other RFID readers operating in the same radio frequency. In this example, RFID reader 101 may experience adjacent channel and co-channel interference (see description in FIG. 2) which may be caused by signals transmitting, for instance, from other RFID devices operating in the vicinity of RFID reader 101.

According to a particular embodiment, in an RFID system 100, an interfering signal may be generated in a variety of ways. In a particular embodiment, when RFID reader 101 receives signals, a carrier signal from the RFID reader transmitter (not shown) and the carrier signal reflected from antenna 112 may couple generating a "self-jammer signal." Such coupling may be due to antenna 112 impedance mismatch and/or isolation. Additionally, a self-jammer signal may be generated by transmitter-to-receiver coupling. Such coupling may occur in the antenna system of RFID reader 101 or may occur elsewhere within the RFID reader. According to a particular embodiment, a self-jammer signal may be an amplitude- and phase-shifted version of the signal generated by the local oscillator in RFID reader 101. According to a particular embodiment, one or more self-jammer signals may be generated in RFID system 100 comprising multiple transmitters and/or multiple antennas. Additionally, various self-jammer signals may be generated in RFID system 100 at various times. For instance, at time $t_1$ a first self-jammer signal may be generated in a particular embodiment of RFID system 100 and at time $t_2$ a second self-jammer signal may be generated. However, these are merely examples of self-jammer signals in an RFID system and claimed subject matter is not so limited.

Figure 2:
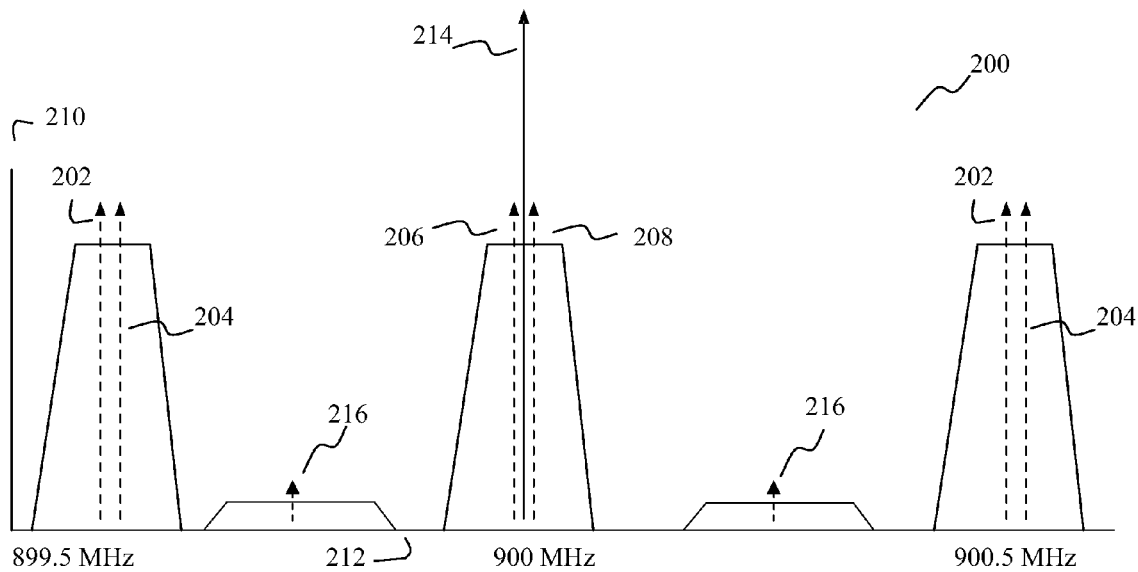
FIG. 2 is a graphical representation of signals in an embodiment of an RFID system.

FIG. 2 is a graphical representation of signals in an embodiment of an RFID system 200. On the graph, y-axis 210 represents amplitude, x-axis 212 represents frequency, and relative signal strength is indicated by the height of the arrows on the graph. As discussed above, in a particular embodiment, an RFID reader may be operating in an environment in which there are other RFID readers present and that may be operating in the same frequency. In such an environment, multiple interfering signals may be present. The interfering signals may be continuous wave or modulated signals and may disrupt an ability of an RFID reader to interpret information sent by an RFID tag.

In this system, relatively weak tag signals 216 may be degraded in the presence of interfering signals, such as, for instance, self-jammer 214, continuous-wave adjacent-channel blockers 202, modulated adjacent-channel blockers 204, continuous-wave co-channel blockers 206 and modulated co-channel blocker 208. In a particular embodiment, self-jammer 214 may share a frequency with co-channel blockers 206 and 208 making cancellation of both co-channel blockers 206 and 208 and self-jammer 214 more involved to accomplish.

According to a particular embodiment, a self-jammer signal 214 may be relatively strong compared to the received signal, for example. In a particular embodiment, RFID reader 101 may be capable of transmitting a signal having 30 dBm of power and may have 15 dB of transmit-to-receive isolation. In this example, self-jammer signal 214 may have a power level of 15 dBm. Alternatively, a worst-case antenna reflection may generate an additional 15 dBm of reflected power that may add to a coupled carrier wave and may generate self-jammer signal 214 having 18 dBm of transmitting power.

In a particular embodiment, when an RFID tag sends a modulated tag signal to an RFID reader, the tag signals may be relatively weak in comparison to one or more other interfering signals. A cancellation mechanism for self-jammer signal 214, continuous-wave adjacent-channel blockers 202, modulated adjacent-channel blockers 204, continuous-wave co-channel blockers 206 and/or modulated co-channel blocker 208 may enable RFID reader 101 detection of weak RFID tag signals.

Figure 3:
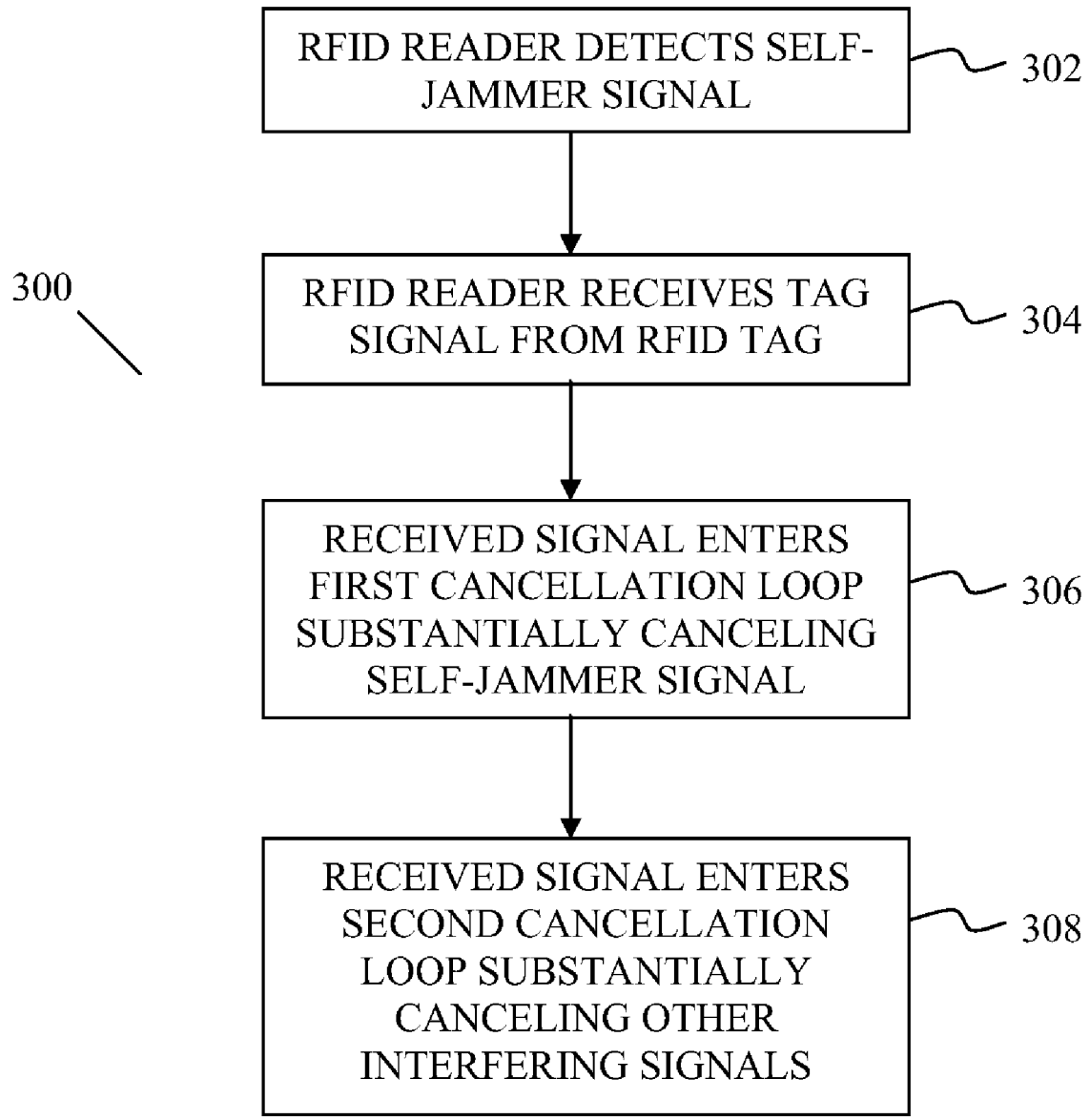
FIG. 3 is a flowchart illustrating a method for use in an embodiment of an RFID system.

FIG. 3 illustrates a process 300, by which RFID reader 101 may detect and cancel interfering signals according to a particular embodiment. Starting at block 302, an RFID reader 101 may detect self-jammer signal 214 and derive self-jammer signal characteristics. At block 304, RFID reader 101 may receive a signal comprising an RFID tag signal as well as interfering signals such as self-jammer signal 214, continuous-wave adjacent-channel blockers 202, modulated adjacent-channel blockers 204, continuous-wave co-channel blockers 206 and modulated co-channel blocker 208. Such a signal will be referred to herein as a "received signal" with reference to FIG. 3.

In a particular embodiment, a cancellation process may begin at block 306 where a received signal may enter a first loop of a dual loop cancellation system. In the first loop, self-jammer signal 214 may be substantially canceled by out-phasing with a cancellation signal generated by a local oscillator of RFID reader 101 and adjusted based at least in part on self-jammer signal 214 characteristics. According to a particular embodiment, at block 308, a received signal may leave the first loop and enter a second loop of a dual-loop cancellation system. In a particular embodiment, the second loop may substantially cancel other interfering signals, such as continuous-wave adjacent-channel blockers 202, modulated adjacent-channel blockers 204, continuous-wave co-channel blockers 206 and modulated co-channel blocker 208. In a particular embodiment, with other interfering signals canceled, RFID tag signals may be substantially more clearly detected. However, this is merely an example of a particular embodiment of a process for canceling a self-jammer signal and other interfering signals in a dual-cancellation loop and claimed subject matter is not so limited. For instance, in another particular embodiment, a process for canceling a self-jammer signal may have more than two cancellation loops.

Figure 4:
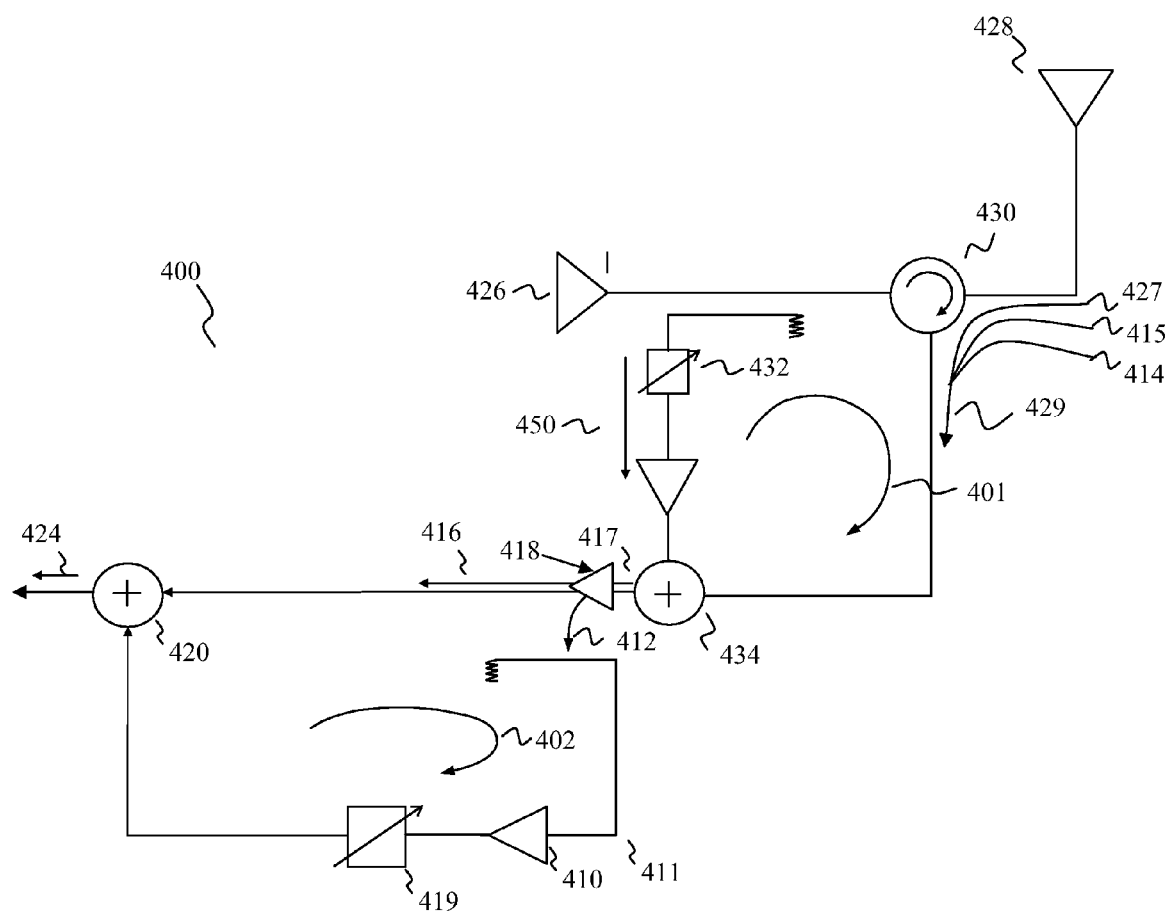
FIG. 4 is a block diagram illustrating a dual loop cancellation system for use in an embodiment of an RFID system.

FIG. 4 is a block diagram representing a particular embodiment of a dual-loop cancellation system 400, capable of canceling unwanted signals received by an RFID reader 101. In a particular embodiment, system 400 may comprise first loop 401 and second loop 402. Each loop may cancel unwanted signals enabling detection of wanted signals, such as, RFID tag signals 415.

In a particular embodiment, after powering on RFID reader 101, self-jammer signal 414 characteristics may be detected in first loop 401. According to a particular embodiment, signal 429 may be received by receiver 428 and routed to loop 401 by circulator 430. According to a particular embodiment, signal 429 may comprise multiple components including, for instance, RFID tag signals 415, self-jammer signal 414 and other interfering signals 427. Such other interfering signals 427 may comprise, for instance, continuous-wave adjacent-channel blockers 202, modulated adjacent-channel blockers 204, continuous-wave co-channel blockers 206 and modulated co-channel blocker 208, although the scope of the claimed subject matter is not limited in these respects.

As discussed above, in a particular embodiment, self-jammer signal 414 may be a linear-scaled, phase-rotated version of an output signal generated by a local oscillator of RFID reader 101 and transmitted from transmitter 426. In cancellation loop 401, transmitter 426 may also generate cancellation signal 450. In a particular embodiment, cancellation signal 450 may be adjusted to be equal, or nearly equal, in amplitude and 180 degrees out-of-phase, or nearly out-of-phase, with self-jammer signal 414.

A variety of methods may be used to control the amplitude and/or phase shift of cancellation signal 450. For example, in cancellation loop 401, the phase and amplitude of cancellation signal 450 may be adjusted by controlling a variable attenuator and variable phase shifter 432. According to a particular embodiment, control of the amplitude and phase shift of cancellation signal 450 may be based at least in part on detected characteristics of self-jammer signal 414. However, this is merely an example of a method of controlling the phase and amplitude of cancellation signal 450 and claimed subject matter is not so limited.

In a particular embodiment, in loop 401, self-jammer signal 414 characteristics may be detected by a variety of methods, such as, for instance, by deriving characteristics based on measurement of a direct-current (DC) product. According to a particular embodiment, because self-jammer signal 414 may comprise substantially the same frequency as the signal generated by a local oscillator of RFID reader 101, a DC product may be generated at the output of receiver 428 front-end mixer (not shown). In a particular embodiment, self-jammer signal characteristics may be detected by measuring the DC term. According to a particular embodiment, the DC product may also be periodically measured to analyze cancellation loop 401 function. For instance, DC product information may be used to periodically adjust the amplitude and phase of cancellation signal 450 to maintain cancellation of self-jammer signal 414. However, this is merely an example of a method of detecting a self-jammer signal and claimed subject matter is not so limited.

As discussed above, loop 401 may comprise cancellation signal 450 generated by transmitter 426. According to a particular embodiment, by combining signal 429 with cancellation signal 450 at summing node 434, self-jammer signal 414 may be out-phased in loop 401. Such out-phasing, may substantially cancel self-jammer signal 414 from signal 429. Here the term "out-phasing" refers to combining two signals with equal amplitude and opposite phase. However, this is merely an example of a method of out-phasing a self-jammer signal and claimed subject matter is not so limited.

Additionally, in a particular embodiment, self-jammer signal 414 may have a delay that may be canceled by introduction of additional loops (not shown) or delay equalizer (not shown) into loop 401 or loop 402. This may also compensate for RFID system noise floor.

In a particular embodiment, upon leaving loop 401, modified signal 417 may comprise RFID tag signals 415 and remaining unwanted signals, such as, interfering signals 427 and any uncancelled self-jammer signals from loop 401. In a particular embodiment, loop 402 may substantially remove all unwanted signals leaving RFID tag signals 415.

In a particular embodiment, modified signal 417 may enter second loop 402 after leaving loop 401. According to a particular embodiment, modified signal 417 may be split into two signals: a through signal 416 and an amplitude-limited signal 412. In a particular embodiment, amplitude-limited signal 412 may pass through limiting amplifier 410. In a particular embodiment, modified signal 417 may be split by a signal splitter 418, for instance. According to a particular embodiment, limiting amplifier 410 may clip signal 412 removing RFID tag signals 415 and leaving remaining signals, such as, weak uncancelled self-jammer signals not cancelled in loop 401 as well as other interfering signals 427.

In a particular embodiment, limiting amplifier 410 may generate in-band and out-of-band distortion products, such as, harmonics and intermodulation (IMD) products. In a particular embodiment, in-band IMDs may arise due to non-linear mixing of self-jammer signal 414 with other interfering signals 427. Out-of-band distortion products may not substantially degrade receiver path performance with low-pass filtering at baseband. On the other hand, in-band distortion products, such as, IMDs may not be removed by baseband filtering and may substantially degrade receiver performance. However, in a particular embodiment, self-jammer signal 414 may be greatly reduced by loop 401. Therefore, the resulting IMDs generated by limiting amplifier 410 may be greatly reduced in dual cancellation loop system 400.

In a particular embodiment, amplitude-limited signal 412 may be linearly scaled and phase-rotated 180-degrees out-of-phase from through signal 416 at variable attenuator and variable phase shifter 419. In a particular embodiment, the signal detection method for loop 402 may be a simple band-limited power detector (not shown). A simple detector power minimization scheme may be used to control the amplitude-and-phase adjusters for loop 402.

According to a particular embodiment, amplitude-limited signal 412 may be summed with through signal 416 at summing node 420 to cancel interfering signals from through signal 416. In a particular embodiment, both amplitude-limited signal 412 and through signal 416 comprise unwanted signals, however, now only through signal 416 substantially comprises RFID tag signals 415. Summing amplitude-limited signal 412 and through signal 416 may substantially out-phase remaining unwanted signals, such as, weak uncancelled self-jammer signals not cancelled in loop 401 as well as other interfering signals 427. Remaining signal 424 may exit summing node 420. In a particular embodiment, remaining signal 424 may comprise RFID tag signals 415 and small distortion products from limiting amplifier 410 which may substantially enable RFID tag signal detection. However, this is merely an example of a method of limiting unwanted signals in a cancellation loop and claimed subject matter is not so limited.

While certain features of claimed subject matter have been illustrated as described herein, many modifications, substitutions, changes and equivalents will now occur to those skilled in the art. It is, therefore, to be understood that the appended claims are intended to cover all such embodiments and changes as fall within the spirit of claimed subject matter.

What is claimed is:

1. A method for canceling a self-jammer signal and one or more other interfering signals, the method comprising:

receiving a radio frequency (RF) signal, in a first cancellation loop, the received RF signal comprising wanted signals and unwanted signals, the unwanted signals comprising the self-jammer signal and one or more other interfering signals;

canceling the self-jammer signal from the received RF signal in the first cancellation loop by modifying the received RF signal with a cancellation signal generated by coupling a transmitted output of a transmitter to the first cancellation loop, the cancellation signal being equal or nearly equal in amplitude to the self-jammer signal and 180 degrees out of phase or nearly out of phase with the self-jammer signal, the modified received RF signal comprising wanted signals and the one or more other interfering signals;

sending the modified received RF signal from an output of the first cancellation loop to an input of the second cancellation loop; and canceling the one or more other interfering signals from the modified received RF signal in the second cancellation loop without up-converting and/or down-converting the one or more interfering signals and by splitting the modified received RF signal output from the first cancellation loop into a through signal and an amplitude-limited signal and combining the through signal and the amplitude-limited signal after the splitting to form an output of the second cancellation loop, the amplitude-limited signal being linearly scaled and phase rotated 180 degrees out of phase from the through signal, the output of the second cancellation loop being different from the output of the first cancellation loop.

2. The method of claim 1, wherein canceling the self-jammer signal further comprises:
   detecting one or more characteristics of the self-jammer signal;
   generating a cancellation signal based at least in part on one or more of the detected characteristics of the self-jammer signal; and
   out-phasing the self-jammer signal with the cancellation signal.

3. The method of claim 1, wherein said canceling the self-jammer signal comprises substantially canceling the self-jammer signal from the received RF signal.

4. The method of claim 1, wherein said canceling the one or more other interfering signals comprises substantially canceling the one or more other interfering signals from the modified RF signal.

5. An apparatus, comprising:
   a dual cancellation-loop circuit capable of canceling a self-jammer signal and one or more other interfering signals from a radio frequency (RF) signal to be received by an RFID reader, the dual-cancellation loop comprising:
   a first cancellation loop capable of canceling the self-jammer signal from the received RF signal to output a modified received RF signal, the modified received RF signal being formed by summing an adjusted cancellation signal with the received RF signal, the adjusted cancellation signal being generated from a transmitted output signal and being equal or nearly equal in amplitude to the self-jammer signal and 180 degrees out of phase or nearly out of phase with the self-jammer signal; and
   a second cancellation loop, an input to the second cancellation loop being coupled to the modified received RF signal output from the first cancellation loop, the second cancellation loop being capable of canceling one or more of the other interfering signals from the modified received RF signal without up-converting and/or down-converting the one or more interfering signals and by splitting the modified received RF signal output from the first cancellation loop into a first modified received RF signal and a second modified received RF signal and combining the first modified received RF signal and the second modified received RF signal after the splitting to form an output of the second cancellation loop, the second modified received RF signal being linearly scaled and phase rotated 180 degrees out of phase from the first modified received RF signal, the output of the second cancellation loop being different from the output of the first cancellation loop.

6. The apparatus of claim 5, wherein the first cancellation loop comprises:
   a receiver comprising an output coupled to an input of a circulator, the receiver capable of receiving the RF signal and outputting the received RF signal to the input of the circulator, and the circulator capable of passing the RF signal received by the receiver and coupled to the circulator from an output of the circulator to a summing node coupled to the output of the circulator; and
   a detection circuit comprising an input coupled to the transmitted output signal and an output coupled to an input to a first phase-and-amplitude adjuster, the detection circuit capable of detecting characteristics of the self-jammer signal from the transmitted output signal and passing the detected characteristics to the phase-and-amplitude adjuster as the cancellation signal;
   the phase-and-amplitude adjuster capable of adjusting a cancellation signal based at least in part on one or more detected characteristics of the self-jammer signal to provide the adjusted cancellation signal and passing the adjusted cancellation signal to the summing node; and
   the summing node capable of summing the received RF signal with the adjusted cancellation signal to substantially out-phase the self-jammer signal from the received RF signal, the summing node being the output of the first cancellation loop.

7. The apparatus of claim 6, wherein the second cancellation loop comprises:
   a signal splitter comprising an input coupled to the summing node, the signal splitter capable of splitting the modified received RF signal into the first modified received RF signal and the second modified received RF signal and outputting the first modified received RF signal from a first output of the signal splitter and the second modified received RF signal from a second output of the signal splitter;
   a limiting amplifier comprising an input coupled to the second output of the signal splitter circuit and an output coupled to an input to a second phase-and-amplitude adjuster, the limiting amplifier capable of clipping wanted signals from the second modified received RF signal;
   a phase-and-amplitude adjuster capable of adjusting the phase or amplitude, or combinations thereof, of the second modified received RF signal based at least in part on one or more of the detected characteristics of the first modified received RF signal; and
   a second summing node capable of summing the first modified received RF signal with the second modified received RF signal to out-phase the one or more other interfering signals from an output of the second summing node, the second summing node being the output of the second cancellation loop.

8. The apparatus of claim 7, wherein the receiver comprises an antenna coupled to the first cancellation loop.

9. The apparatus of claim 5, wherein the second cancellation loop comprises:
   a signal splitter comprising an input coupled to the summing node, the signal splitter capable of splitting the modified received RF signal into the first modified received RF signal and the second modified received RF signal and outputting the first modified received RF signal from a first output of the signal splitter and the second modified received RF signal from a second output of the signal splitter;
   a limiting amplifier comprising an input coupled to the second output of the signal splitter circuit and an output coupled to an input to a second phase-and-amplitude adjuster, the limiting amplifier capable of clipping wanted signals from the second modified received RF signal;
   a phase-and-amplitude adjuster capable of adjusting the phase or amplitude, or combinations thereof, of the second modified received RF signal based at least in part on one or more of the detected characteristics of the first modified received RF signal; and
   a second summing node capable of summing the first modified received RF signal with the second modified received RF signal to out-phase the one or more other interfering signals from an output of the second summing node.

10. The apparatus of claim 9, wherein the receiver comprises an antenna coupled to the first cancellation loop.

* * * * *